US011650767B2

(12) United States Patent
Yan et al.

(10) Patent No.: US 11,650,767 B2
(45) Date of Patent: May 16, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Bing Yan, Kanagawa (JP); Ami Kanzaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 236 days.

(21) Appl. No.: 16/186,603

(22) Filed: Nov. 12, 2018

(65) Prior Publication Data
US 2019/0155554 A1 May 23, 2019

(30) Foreign Application Priority Data

Nov. 22, 2017 (JP) .............................. JP2017-224370

(51) Int. Cl.
*G06F 3/12* (2006.01)

(52) U.S. Cl.
CPC .......... *G06F 3/1207* (2013.01); *G06F 3/1259* (2013.01); *G06F 3/1262* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 7,903,271 B2 * | 3/2011 | Aiyama | G06K 15/00 358/1.15 |
| 8,659,779 B2 | 2/2014 | Hashimoto | |
| 2002/0042797 A1 * | 4/2002 | Kimura | G06F 3/1262 715/274 |
| 2002/0131069 A1 * | 9/2002 | Wanda | G06F 3/121 358/1.14 |
| 2008/0123130 A1 * | 5/2008 | Matsumoto | G06F 3/1285 358/1.15 |
| 2012/0218596 A1 * | 8/2012 | Hashimoto | G06F 3/1288 358/1.15 |
| 2016/0147561 A1 * | 5/2016 | Murata | G06F 11/1438 718/101 |

FOREIGN PATENT DOCUMENTS

| | | |
|---|---|---|
| EP | 2808871 | 12/2014 |
| JP | 2006126986 | 5/2006 |
| JP | 2006195606 | 7/2006 |
| JP | 2007213613 A * | 8/2007 |
| JP | 2009086873 A * | 9/2007 |
| JP | 2009037309 | 2/2009 |
| JP | 2012181572 | 9/2012 |
| JP | 2014112289 * | 6/2014 |
| JP | 2014236288 | 12/2014 |

OTHER PUBLICATIONS

Office Action of Japan Counterpart Application, with English translation thereof, dated May 25, 2021, pp. 1-5.

* cited by examiner

*Primary Examiner* — Fan Zhang

(74) *Attorney, Agent, or Firm* — JCIPRNET

(57) ABSTRACT

An information processing apparatus includes a reception unit that receives a progress condition of a group printing job constituted by plural printing jobs, and a presentation unit that presents the progress condition of the group printing job in accordance with an item for presenting the progress condition.

14 Claims, 15 Drawing Sheets

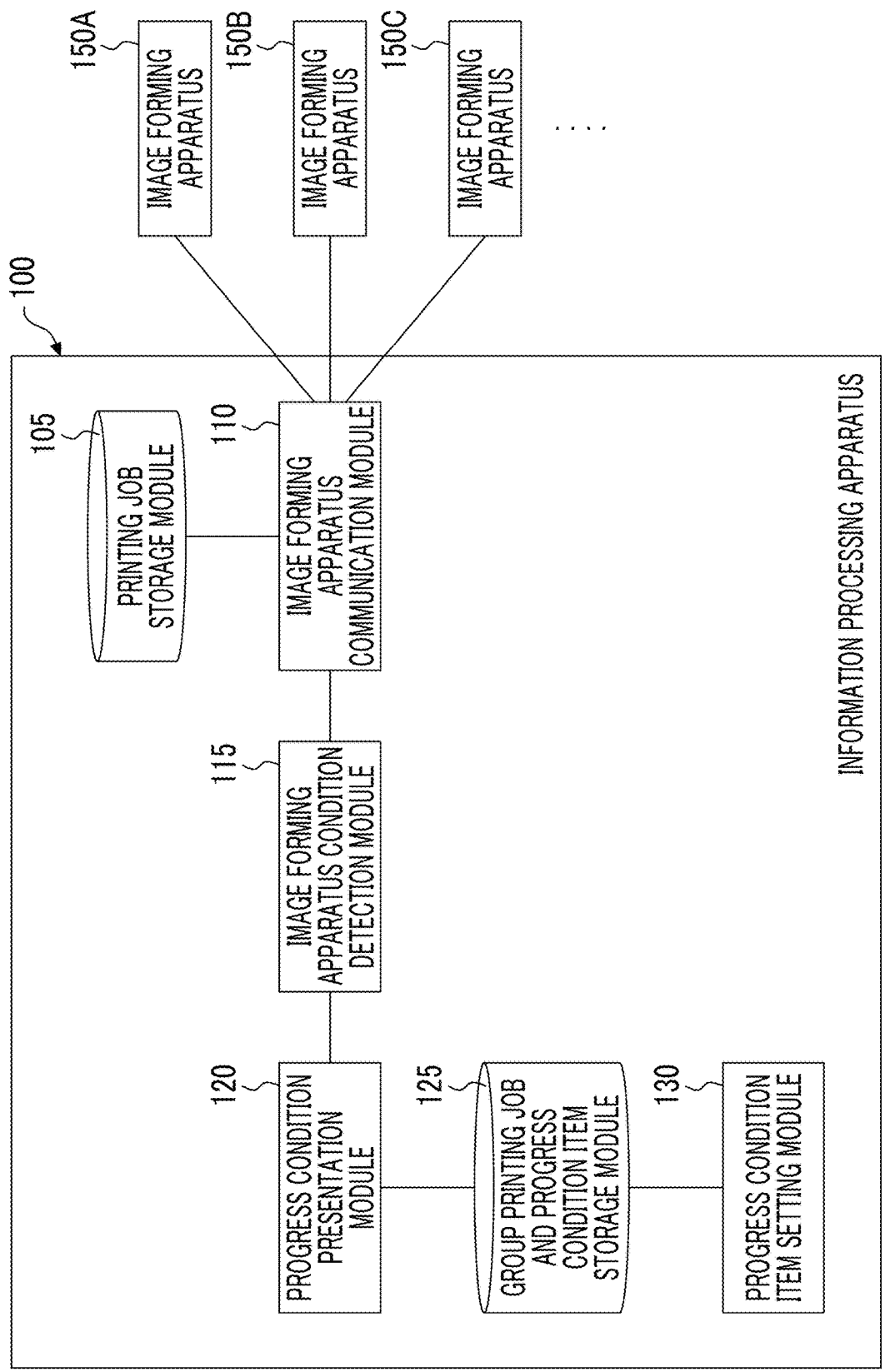

| | ID ▶ | PRINTING JOB NAME | STATUS | NUMBER OF COPIES | TRANSMISSION DESTINATION | DETAIL |
|---|---|---|---|---|---|---|
| ☐ | 10 | 📄 JOB 10 | TRANSMISSION WAITING | 1 | | ⓘ |
| ☐ | 9 | ▶📑 GROUP JOB A (FOUR JOBS) | TRANSMISSION WAITING | | | ⓘ |
| ☐ | 8 | ▶📑 GROUP JOB B (THREE JOBS) | TRANSMISSION WAITING | | | ⓘ |
| ☐ | 1 | 📄 JOB 1 | TRANSMISSION WAITING | 5 | | ⓘ |

412 414 416 418 420 422 424
400
410
432
434

(b)

| | ID ▶ | PRINTING JOB NAME | STATUS | NUMBER OF COPIES | TRANSMISSION DESTINATION | DETAIL |
|---|---|---|---|---|---|---|
| ☐ | 10 | 📄 JOB 10 | TRANSMISSION WAITING | 1 | | ⓘ |
| ☐ | 9 | ▼📑 GROUP JOB A (FOUR JOBS) | TRANSMISSION WAITING | | | ⓘ |
| ☐ | 6 | 📄 JOB 6 | TRANSMISSION WAITING | 5 | | ⓘ |
| ☐ | 5 | 📄 JOB 5 | TRANSMISSION WAITING | 5 | | ⓘ |
| ☐ | 4 | 📄 JOB 4 | TRANSMISSION WAITING | 5 | | ⓘ |
| ☐ | 3 | 📄 JOB 3 | TRANSMISSION WAITING | 5 | | ⓘ |
| ☐ | 8 | ▶📑 GROUP JOB B (THREE JOBS) | TRANSMISSION WAITING | | | ⓘ |
| ☐ | 7 | 📄 JOB 7 | TRANSMISSION WAITING | | | ⓘ |
| ☐ | 11 | ▲📑 GROUP JOB C (TWO JOBS) | TRANSMISSION WAITING | 5 | | ⓘ |
| ☐ | 1 | 📄 JOB 1 | TRANSMISSION WAITING | 5 | | ⓘ |

412 414 416 418 420 422 424
400
410

FIG. 5
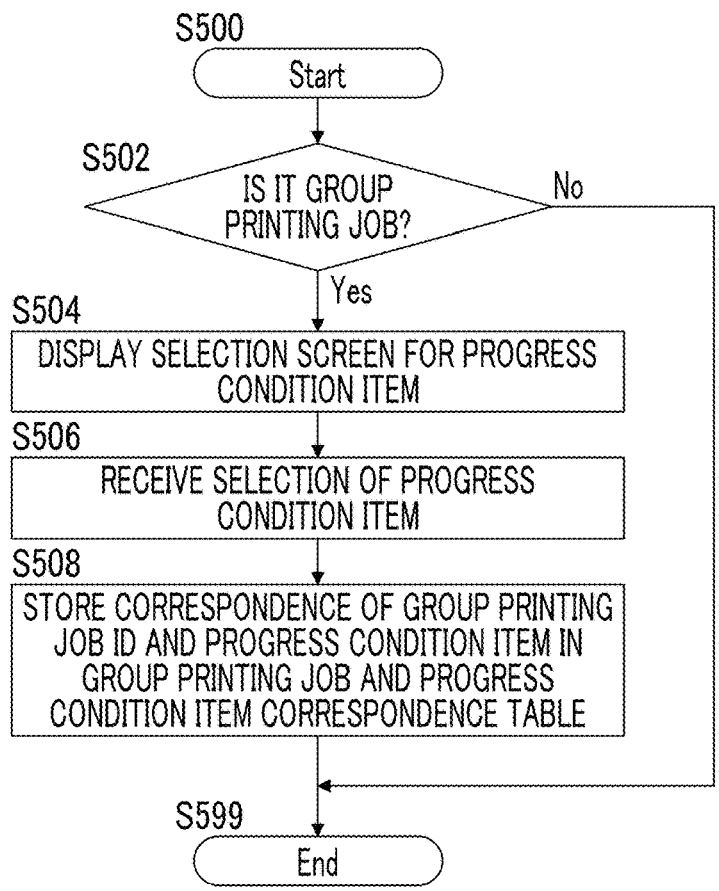
FIG. 6
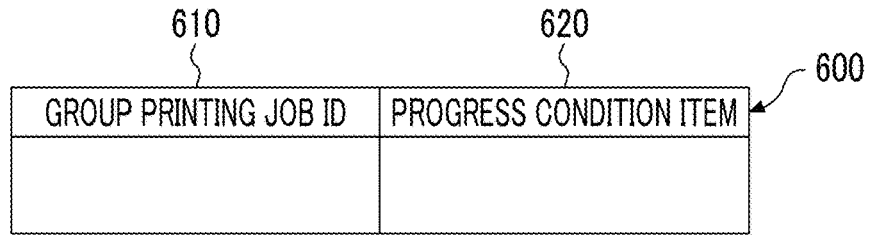
FIG. 7
| 705 | 710 | 715 | 720 | 725 | 700 |
|---|---|---|---|---|---|
| PRINTING JOB ID | GROUP FLAG | GROUP PRINTING JOB NAME | NUMBER OF PRINTING JOBS | PRINTING JOB ID | |
| 9 | 1 | GROUP JOB A | 5 | 1, 10, 15, 16, 20 | |

FIG. 8

| PRINTING JOB ID | GROUP FLAG | PRINTING JOB NAME | OWNER | NUMBER OF PAGES | NUMBER OF COPIES |
|---|---|---|---|---|---|
| 1 | 0 | PAMPHLET OO-1 | USER A | 16 | 50 |

| SHEET SIZE | SHEET TYPE | PRINTING DOCUMENT | COLOR/BLACK AND WHITE | DESIGNATED DATE AND TIME | POST-PROCESSING |
|---|---|---|---|---|---|
| A4 | | DOCUMENT ID | COLOR | | |

FIG. 9

| 905 | 910 | 915 | 920 | 925 |
|---|---|---|---|---|
| PRINTING APPARATUS ID | PRINTING APPARATUS NAME | PRINTING SPEED | MOUNTABLE TONER TYPE | MOUNTABLE SHEET |
|  |  |  |  |  |

| 930 | 935 | 940 | 945 | 950 |
|---|---|---|---|---|
| DOUBLE-SIDED PRINTING | MAXIMUM SHEET FEED CAPACITY | NUMBER OF DISCHARGING DESTINATIONS | POST-PROCESSING FUNCTION | PRINTING COST |
|  |  |  |  |  |

| PRINTING APPARATUS ID | DATE AND TIME | PRINTING JOB ID | NUMBER OF PRINTED PAGES | NUMBER OF SURFACES | NUMBER OF COPIES |
|---|---|---|---|---|---|
| 1210 | 1220 | 1230 | 1240 | 1250 | 1260 |
|  |  |  |  |  |  |

| GROUP PRINTING JOB ID | PROCESSING CONDITION FLAG | NUMBER OF PRINTING JOBS | START DATE AND TIME | COMPLETION DATE AND TIME | ... |
|---|---|---|---|---|---|
| | | | | | |

| | ID ▶ | PRINTING JOB NAME | STATUS | NUMBER OF COPIES | TRANSMISSION DESTINATION | PROGRESS | DETAIL |
|---|---|---|---|---|---|---|---|
| ☐ | 10 | JOB 10 | TRANSMISSION WAITING | | | | ⓘ |
| ☐ | 9 | ♻ STOCK XXX | TRANSMISSION WAITING | 1 | | ▭▭ | ⓘ |
| ☐ | 8 | ♻ DELIVERY DESTINATION YYY | TRANSMISSION WAITING | | | ▭ | ⓘ |
| ☐ | 1 | JOB 1 | TRANSMISSION WAITING | 5 | | | ⓘ |

FIG. 15

| | 1512 | 1514 | 1516 PRINTING JOB NAME | 1518 STATUS | 1520 NUMBER OF COPIES | 1522 TRANSMISSION DESTINATION | 1524 PROGRESS | 1526 DETAIL |
|---|---|---|---|---|---|---|---|---|
| ☐ | | ID ▶ | | | | | | |
| ☐ | | 10 | 📄 JOB 10 | TRANSMISSION WAITING | 1 | | | ⓘ |
| ☐ | | 9 | ♻ STOCK XXX | TRANSMISSION WAITING | | | NUMBER OF PAGES 256/500 | ⓘ |
| ☐ | | 8 | ♻ DELIVERY DESTINATION YYY | TRANSMISSION WAITING | | | NUMBER OF JOBS 5/30 | ⓘ |
| ☐ | | 1 | 📄 JOB 1 | TRANSMISSION WAITING | 5 | | | ⓘ |

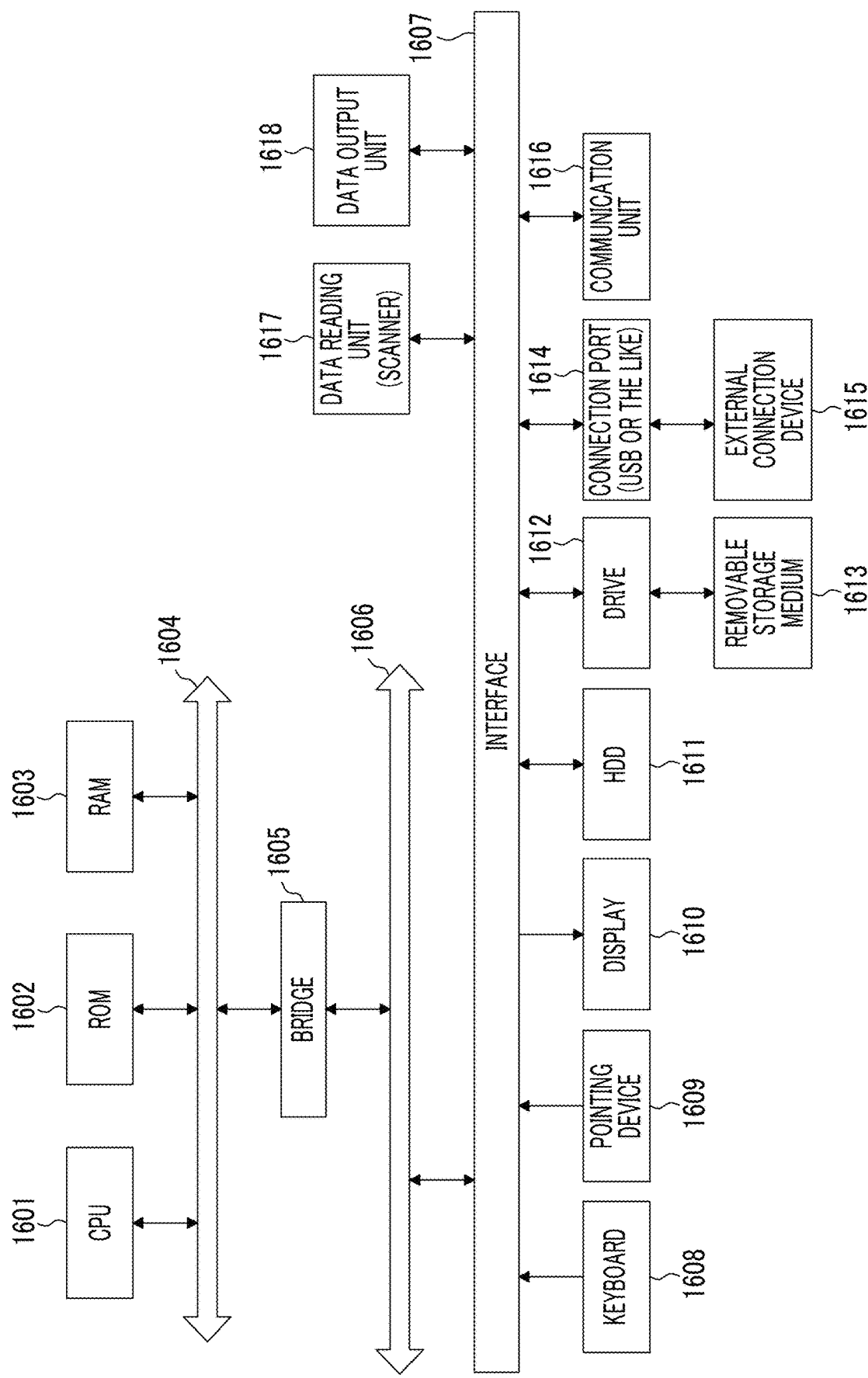

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-224370 filed Nov. 22, 2017.

BACKGROUND

Technical Field

The present invention relates to an information processing apparatus and a non-transitory computer readable medium storing an information processing program.

SUMMARY

According to an aspect of the invention, there is provided an information processing apparatus including a reception unit that receives a progress condition of a group printing job constituted by plural printing jobs, and a presentation unit that presents the progress condition of the group printing job in accordance with an item for presenting the progress condition.

BRIEF DESCRIPTION OF THE DRAWINGS

Exemplary embodiment(s) of the present invention will be described in detail based on the following figures, wherein:

FIG. 1 is a conceptual module configuration diagram illustrating a configuration example according to this exemplary embodiment;

FIG. 4 is a diagram illustrating a display example of a screen according to this exemplary embodiment;

FIG. 5 is a flowchart illustrating a processing example according to this exemplary embodiment;

FIG. 6 is a diagram illustrating an example of a data structure of a group printing job and progress condition item correspondence table;

FIG. 7 is a diagram illustrating an example of a data structure of a group printing job table;

FIG. 8 is a diagram illustrating an example of a data structure of a printing job table;

FIG. 9 is a diagram illustrating an example of a data structure of a printing apparatus table;

FIG. 12 is a diagram illustrating an example of a data structure of a printing apparatus-based processing condition table;

FIG. 13 is a diagram illustrating an example of a data structure of a group printing job processing condition table;

FIG. 14 is a diagram illustrating a display example of a screen;

FIG. 15 is a diagram illustrating a display example of a screen according to this exemplary embodiment; and FIG. 16 is a block diagram illustrating a hardware configuration example of a computer for realizing this exemplary embodiment.

DETAILED DESCRIPTION

Figure 2A:
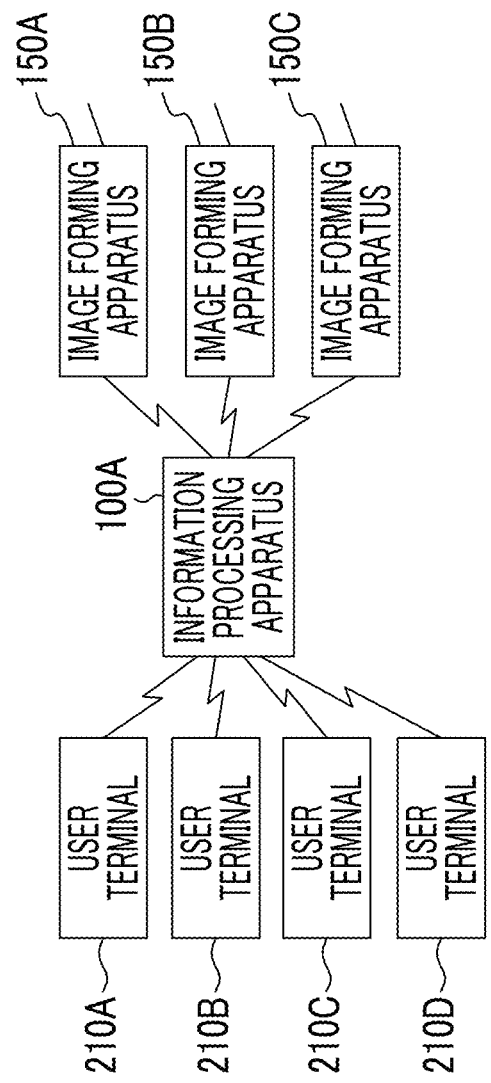
FIGS. 2A and 2B are diagrams illustrating a system configuration example using this exemplary embodiment.

Hereinafter, an example of an exemplary embodiment in realizing the invention will be described with reference to the accompanying drawings.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment transmits a printing job to an image forming apparatus 150 (hereinafter, also referred to as a printing apparatus), and presents the progress condition of the printing job. As illustrated in the example of FIG. 1, the information processing apparatus includes a printing job storage module 105, an image forming apparatus communication module 110, an image forming apparatus condition detection module 115, a progress condition presentation module 120, a group printing job and progress condition item storage module 125, and a progress condition item setting module 130.

This exemplary embodiment particularly presents the progress condition of a group printing job constituted by plural printing jobs.

The group printing job is constituted by plural printing jobs. A group printing job which is a set of printing jobs is created in accordance with a management method for a user's printing job. For example, the following operation may be performed by the group printing job.

(1) Printing jobs related to a customer's order may be treated as a set.

(2) Printing jobs accumulated in the information processing apparatus 100 having a function as a spooler may be collectively treated in units in which operation may be effectively performed as follows according to a printing process operator's situation.

(a) Printing jobs are collected for each output sheet.

(b) Printing jobs having the same required post-processing are collected.

(c) Printing jobs are collected for each operator in charge.

(d) Printing jobs are collected in accordance with an operation date and an operation time.

An example of the image forming apparatus 150 is a production printer. The production printer performs light printing for an intra-office printing department of a company, and a print shop, and the like. In general, the image forming apparatus is in charge of a large quantity of printing. Meanwhile, the image forming apparatus is not limited to the production printer, and may be applied to general printers (printers for business, printers for home, and the like).

Particularly, in a case of the production printer, the presentation of the progress condition of a group printing job is important in managing a large amount of printing processing by a user who is a person in charge.

The printing job storage module 105 is connected to the image forming apparatus communication module 110. The printing job storage module 105 stores information on a printing job or a group printing job. For example, the printing job storage module stores a group printing job table 700 and a printing job table 800 which are to be described later with reference to FIGS. 7 and 8.

The image forming apparatus communication module 110 is connected to the printing job storage module 105, the image forming apparatus condition detection module 115, an image forming apparatus 150A, an image forming apparatus 150B, and an image forming apparatus 150C. The image forming apparatus communication module 110 performs communication with the image forming apparatus 150. For example, the image forming apparatus communication module 110 transmits a printing job or a group printing job included in the printing job storage module 105 to the image forming apparatus 150. For example, the image forming apparatus communication module has a schedule of printing, and transmits the printing job or the group printing job to the image forming apparatus 150 in accordance with the schedule to perform printing processing.

The image forming apparatus communication module 110 inquires the image forming apparatus 150 of the progress condition of the printing job or the group printing job in accordance with an instruction of the image forming apparatus condition detection module 115, and receives the progress condition from the image forming apparatus 150 as a reply.

The image forming apparatus condition detection module 115 is connected to the image forming apparatus communication module 110 and the progress condition presentation module 120. The image forming apparatus condition detection module 115 receives the progress condition of a printing job or a group printing job from the image forming apparatus 150 through the image forming apparatus communication module 110.

The progress condition presentation module 120 is connected to the image forming apparatus condition detection module 115 and the group printing job and progress condition item storage module 125. The progress condition presentation module 120 presents the progress condition of the printing job or the group printing job in accordance with an item for presenting the progress condition. Here, the "item for presenting the progress condition" may be an item which is determined in advance. For example, the item may be set to be an item different from a single printing job (a printing job that does not constitute the group printing job, and refers to a printing job for designating printing processing by only one printing job). In addition, the item may be determined for each group printing job. The item may be set by a user.

Meanwhile, the presentation may include the output of a sound using a sound output device, such as a speaker, and a combination with a vibration, and the like, in addition to display on a display device such as a liquid crystal display.

The "item for presenting the progress condition" may include at least the number of terminated printing jobs constituting the group printing job. Regarding the progress condition of the number of terminated printing jobs, the individual printing jobs have different amounts of processing, and thus it is possible to know the termination of the individual printing jobs included in the group printing job, rather than simply indicating a time until the printing job is terminated. For example, in a case where the owners of printed matter are different from each other, it is possible to collect printed matter for each owner by knowing the termination of the individual printing jobs.

The progress condition presentation module 120 may present the item together with the progress condition. The progress condition is presented using a progress bar, and the "item for presenting the progress condition" may be presented within the progress bar. Meanwhile, the progress bar refers to one of elements (Widget) of a graphical user interface, and presents how much processing has been progressed in the entire amount of processing. For example, a progress rate is shown by a horizontal bar. In addition, for example, in a case where the "item for presenting the progress condition" is the number of completed printing jobs, the number or ratio of printing jobs for which printing has been completed (a ratio of the number of printing jobs for which printing has been completed to a total number of printing jobs included in the group printing job) may be presented on the progress bar.

The progress condition presentation module 120 determines the unit of the progress bar in accordance with a maximum value of the "item for presenting the progress condition".

The group printing job and progress condition item storage module 125 is connected to the progress condition presentation module 120 and the progress condition item setting module 130. The group printing job and progress condition item storage module 125 stores the "item for presenting the progress condition" which is set by the progress condition item setting module 130. The "item for presenting the progress condition" is transmitted to the progress condition presentation module 120. For example, the group printing job and progress condition item storage module stores a group printing job and progress condition item correspondence table 600 to be described later with referenced to FIG. 6.

The progress condition item setting module 130 is connected to the group printing job and progress condition item storage module 125. The progress condition item setting module 130 sets the "item for presenting the progress condition" for a group printing job. That is, it is possible to set the item of the progress bar in units of group printing jobs. Here, the setting may refer to setting of an item determined in advance, or may refer to setting performed by the user's operation.

In addition, the progress condition item setting module 130 may set the item of the progress bar in accordance with forming conditions for a group printing job. As the "forming conditions" as mentioned herein, the number of printed surfaces may be set as the item of the progress bar, for example, on the condition that printing paper which is set in the image forming apparatus 150 is A4 paper. On the condition that printing paper which is set in the image forming apparatus 150 is roll paper, the length of the printed roll may be set as the item of the progress bar. In a case where printing jobs having the same operator are collectively integrated into a group printing job, the number of printing jobs may be set as the item of the progress bar. These may be realized by previously preparing, for example, a table in which forming conditions for the group printing job and the item of the progress bar are associated with each other.

The image forming apparatuses 150 (image forming apparatus 150A, the image forming apparatus 150B, and the image forming apparatus 150C) are connected to the image forming apparatus communication module 110 of the information processing apparatus 100. The image forming apparatus 150 receives the printing job or the group printing job transmitted from the information processing apparatus 100 and performs printing processing in accordance with the printing job. The progress condition in the printing processing is transmitted to the image forming apparatus communication module 110 of the information processing apparatus 100.

Meanwhile, in the example of FIG. 1, three image forming apparatuses 150 are connected, but one or more image forming apparatuses 150 may be connected.

Figure 2B:
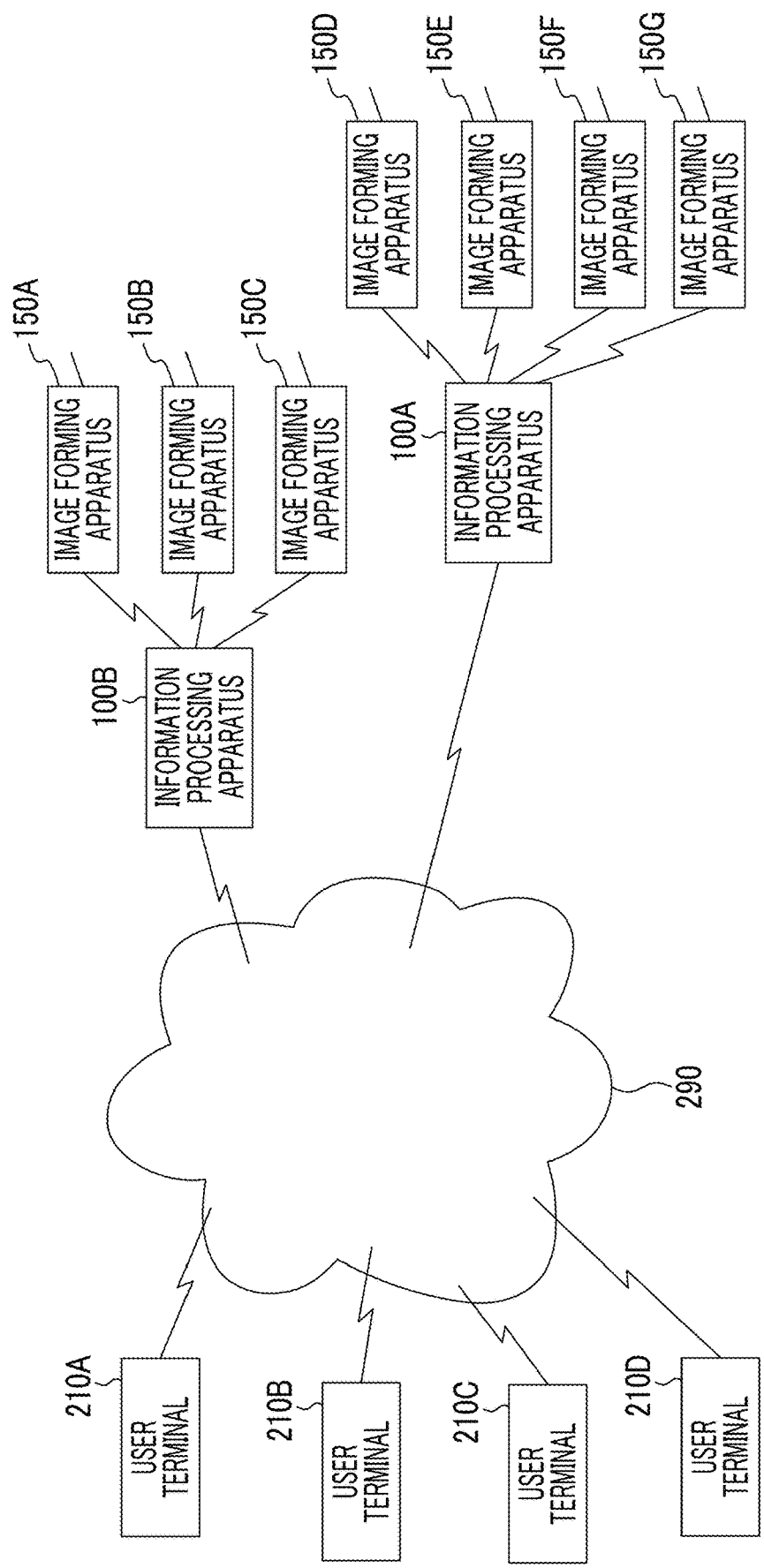

FIGS. 2A and 2B are diagrams illustrating a system configuration example using this exemplary embodiment.

Meanwhile, the information processing apparatus 100 may be included in an external controller of the image forming apparatus 150.

In the example illustrated in FIG. 2A, an information processing apparatus 100A is connected to user terminals 210 (a user terminal 210A, a user terminal 210B, a user terminal 210C, and a user terminal 210D), the image forming apparatuses 150 (the image forming apparatus 150A, the image forming apparatus 150B, and the image forming apparatus 150C).

The information processing apparatus 100A receives a printing job or a group printing job from the user terminal 210 and transmits the printing job or the group printing job to the image forming apparatus 150 suitable for the printing job or the group printing job. The image forming apparatus 150 performs printing processing in accordance with the received printing job or group printing job.

In the example illustrated in FIG. 2B, the information processing apparatus 100A, the information processing apparatus 100B, the user terminal 210A, the user terminal 210B, the user terminal 210C, and the user terminal 210D are connected to each other through a communication line 290. The communication line 290 may be a wireless line, a wired line, or a combination thereof, and may be, for example, the Internet, an intranet, or the like as communication infrastructure. In addition, the functions of the information processing apparatus 100 may be realized as cloud service.

The information processing apparatus 100A is connected to the image forming apparatus 150A, the image forming apparatus 150B, and the image forming apparatus 150C.

The information processing apparatus 100B is connected to an image forming apparatus 150D, an image forming apparatus 150E, an image forming apparatus 150F, and an image forming apparatus 150G.

The information processing apparatus 100 receives a printing job or a group printing job from the user terminal 210 through the communication line 290 and transmits the printing job or the group printing job to the image forming apparatus 150 suitable for the printing job or the group printing job. The image forming apparatus 150 performs printing processing in accordance with the received printing job or group printing job.

Figure 3B:
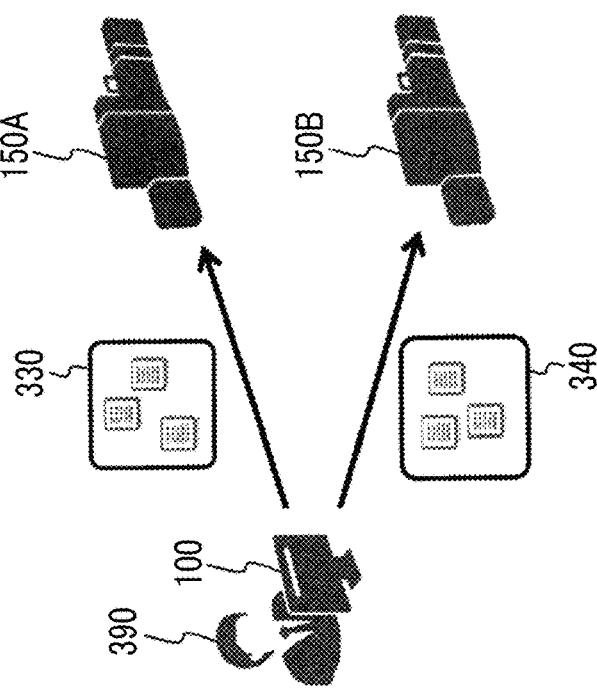
FIGS. 3A and 3B are diagrams illustrating a use example of this exemplary embodiment.
Figure 3A:
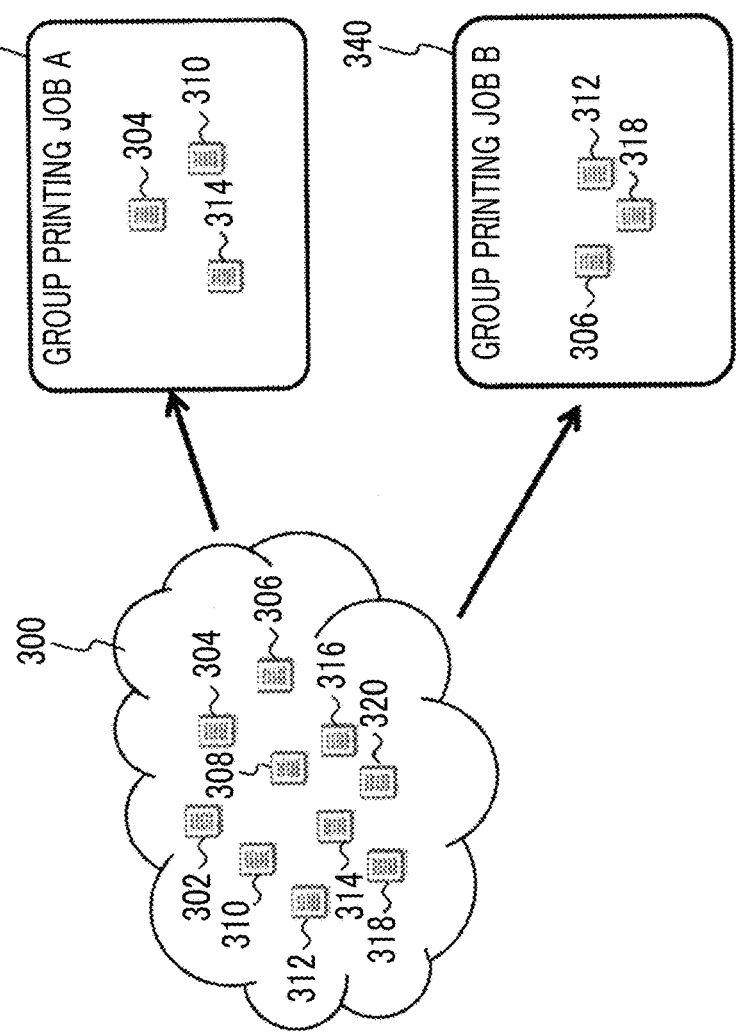

FIGS. 3A and 3B are diagrams illustrating a use example of this exemplary embodiment. A group printing job will be described in more detail.

The group printing job is constituted by plural printing jobs. That is, the group printing job is a unit of the collecting of some printing jobs, and is like a box including plural printing jobs. Therefore, the group printing job itself does not have printing data and printing setting, and the printing jobs as constituent elements individually have printing data and printing setting.

For example, some printing jobs are collected into any bundle advantageous to the user, such as the same sheet used in printing, and collective operations of the printing jobs are realized with respect to a group printing job which is a set of printing jobs. That is, the group printing job may be treated as just one printing job.

In addition, totalized information (for example, the number of printed sheets, and the like) of the printing jobs included in the group printing job is one of determination materials during the distribution of the printing jobs to the plural image forming apparatuses 150.

A printing job group 300 includes a printing job 302, a printing job 304, a printing job 306, a printing job 308, a printing job 310, a printing job 312, a printing job 314, a printing job 316, a printing job 318, a printing job 320, and the like. Among these, the printing jobs may be collected as described above. For example, it is possible to create a group printing job A 330 including the printing job 304, the printing job 310, and the printing job 314. In addition, it is possible to create a group printing job B 340 including the printing job 306, the printing job 312, and the printing job 318.

The information processing apparatus 100 may cause each of the image forming apparatuses 150 to perform processing such as the transmission of the printing job, pause, trial printing, restart of printing, and cancellation by an operation of the printing job group 300.

In the group printing job A 330, in a case where any sheet A is set as a printing sheet, the image forming apparatus 150A having the sheet A set in advance (also referred to as "a stock X is set") is selected, and the group printing job A 330 is transmitted to the image forming apparatus 150A.

Additionally, in the group printing job B 340, in a case where a total number of printed sheets is 3000, the image forming apparatus 150B capable of performing printing without any work in the middle of the output of 3000 sheets (without removing the printed sheets from a discharged sheet reception unit in the middle of printing) is selected, and the group printing job B 340 is transmitted to the image forming apparatus 150B. In this case, the discharged sheet reception unit of the image forming apparatus 150B may receive 3000 sheets or more.

FIG. 4 is a diagram illustrating a display example of a screen 400 according to this exemplary embodiment, and illustrates displays examples of a group printing job and a printing job in the information processing apparatus 100.

In (a) of FIG. 4, a printing job display region 410 is displayed on the screen 400. The printing job display region 410 includes a check column 412, an ID column 414, a printing job name column 416, a status column 418, a number-of-copies column 420, a transmission destination column 422, and a detail column 424. The check column 412 includes a check column to be processed. The ID column 414 displays identification information (ID) of the printing job or the group printing job. The printing job name column 416 displays a printing job name of the printing job or the group printing job. The status column 418 displays the current conditions (status) of the printing job or the group printing job. The number-of-copies column 420 displays the number of copies in the printing job or the group printing job. The transmission destination column 422 displays a transmission destination (image forming apparatus 150) of the printing job or the group printing job. The detail column 424 has a button for displaying details of the printing job or the group printing job.

The following operation method for the group printing job is the same as that for the single printing job (printing job in the related art).

Printing job operations (transmission, copying, deletion, holding/cancellation, and the like) except for [editing]

Printing job operations (printing/restart, proof printing, pause, cancellation, and the like)

In addition, whether or not each operation is performed and action in the operation change depending on the status of printing jobs included in the group printing job.

In the printing job display region 410 illustrated in the example of (a) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 8, printing job name: group job B (three jobs), status: transmission waiting, the-number-of-copies: undecided, and transmission destination: undecided, and a fourth line shows ID: 1, printing job name: job 1, status: transmission waiting, the-number-of-copies: 5, and transmission destination: undecided.

The printing job name columns 416 in the second and third lines are respectively given a group printing job mark 432 and a group printing job mark 434, which indicate group printing jobs. That is, an icon (a black triangular mark in (a) and (b) of FIG. 4) which indicates an opened/closed state of the group printing job is displayed at the head of the printing job name column 416. Switching between open display and close display of a target group printing job is performed by the user's selection operation (click operation) for the group printing job mark 432 and the group printing job mark 434. During initial display, the display is performed in a state where all group printing jobs are closed. Meanwhile, the "closed" refers to the display of printing jobs constituting the group printing job (see (b) of FIG. 4), and the "opened" refers to the display of only the group printing job (as if only one printing job is present).

A state where the group printing job is opened is illustrated in the example of (b) of FIG. 4.

In the printing job display region 410 illustrated in the example of (b) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 6, printing job name: job 6, status: transmission waiting, the-number-of-copies: 5, and transmission destination: undecided, a fourth line shows ID: 5, printing job name: job 5, status: transmission waiting, the-number-of-copies: 5, and transmission destination: undecided, a fifth line shows ID: 4, printing job name: job 4, status: transmission waiting, the-number-of-copies: 5, and transmission destination: undecided, a sixth line shows ID: 3, printing job name: job 3, status: transmission waiting, the-number-of-copies: 5, and transmission destination: undecided, a seventh line shows ID: 8, printing job name: group job B (three jobs), status: transmission waiting, the-number-of-copies: undecided, and transmission destination: undecided, an eighth line shows ID: 7, printing job name: job 7, status: transmission waiting, the-number-of-copies: 5, and transmission destination: undecided, a ninth line shows ID: 11, printing job name: group job C (two jobs), status: transmission waiting, the-number-of-copies: undecided, and transmission destination: undecided, and a tenth line shows ID: 1, printing job name: job 1, status: transmission waiting, the-number-of-copies: 5, and transmission destination: undecided. The third line to the sixth line show a printing job group constituting a group printing job A, and the eighth line and the ninth line show a printing job group constituting a group printing job B. Meanwhile, the group printing job may further include a group printing job. The group printing job B includes a group printing job C. Meanwhile, it may be possible to form a group printing job up to a predetermined number of levels (for example, a maximum of three levels, and the like).

Meanwhile, in a case where the sorting of the ID column 414 is performed in the state of (b) of FIG. 4, a sorting target is a root printing job (a printing job which is not positioned under the group printing job, that is, a single printing job and a group printing job). This is because it is not suitable that printing jobs constituting the group printing job are separated from the group printing job and set to be sorting targets.

Additionally, in a case where the detail column 424 is selected by the user's selection operation, properties of printing jobs in the selected line are presented to a property screen (pop-up screen or the like). That is, general results of the properties of the printing jobs included in the group printing job are presented. For example, a logical OR, totalization, and the like of the properties are performed. Specifically, the extraction of properties of each printing job, the extraction of required post-processing functions (for example, stapler, binding, punching, and the like; also referred to as a finisher), the totalization of the number of sheets for each type of sheet, and the like are performed.

FIG. 5 is a flowchart illustrating a processing example according to this exemplary embodiment. In this exemplary embodiment, the processing is performed by the progress condition item setting module 130. For example, an item is set in a detail column 424 in the screen 400 illustrated in FIG. 4.

In step S502, it is determined whether being a group printing job. The processing proceeds to step S504 in a case of the group printing job, and is terminated otherwise (step S599).

In step S504, a screen for selecting a progress condition is displayed. For example, items indicating the progress condition of the group printing job are displayed as a list by a pull-down menu. Specifically, the items include the number of printed sheets, the length of a printed sheet (meter or the like) in a case where the sheet is roll paper, the number of printed copies, the number or ratio of printing jobs for which printing has been completed, and the like.

In step S506, the selection of the progress condition item is received.

In step S508, the correspondence of a group printing job ID and the progress condition item is stored in the group printing job and progress condition item correspondence table 600.

FIG. 6 is a diagram illustrating an example of a data structure of the group printing job and progress condition item correspondence table 600.

The group printing job and progress condition item correspondence table 600 includes a group printing job ID column 610 and a progress condition item column 620. The group printing job ID column 610 stores information (group printing job identification (ID)) for uniquely identifying a group printing job in this exemplary embodiment. The progress condition item column 620 stores items indicating the progress condition of the group printing job.

FIG. 7 is a diagram illustrating an example of a data structure of the group printing job table 700. The group printing job table 700 includes a printing job ID column 705, a group flag column 710, a group printing job name column 715, a number-of-printing jobs column 720, and a printing job ID column 725. The printing job ID column 705 stores information (printing job ID) for uniquely identifying a printing job or a group printing job in this exemplary embodiment. The group flag column 710 stores information (group flag) indicating whether being a group printing job. The group printing job name column 715 stores the name of the group printing job. The number-of-printing jobs column 720 store the number of printing jobs included in the group printing job. The printing job ID column 725 stores a printing job ID included in the group printing job. Plural printing jobs ID are stored in the printing job ID column 725.

The process of step S502 is performed by checking the group flag column 710.

For example, FIG. 7 shows group flag: 1 (a flag indicating being a group printing job), group printing job name: group job A, the number of printing jobs: 5, printing job ID: 1, 10, 15, 16, 20, and highest priority printing job ID: 15, regarding printing job ID: 9.

Meanwhile, IDs are described in order of processing in the printing job ID column 725. That is, it is possible to specify the order of printing from the printing job ID column 725.

The printing job table 800 shows an example of a data structure of a single printing job or printing jobs constituting a group printing job.

FIG. 8 is a diagram illustrating an example of a data structure of the printing job table 800. The printing job table 800 includes a printing job ID column 805, a group flag column 810, a printing job name column 815, an owner column 820, a number-of-pages column 825, a number-of-copies column 830, a sheet size column 835, a sheet type column 840, a printing document column 845, a color/black-and-white column 850, a designated date and time column 855, and a post-processing column 860. The printing job ID column 805 stores a printing job ID. The group flag column 810 stores information (group flag) indicating whether being a group printing job. The printing job name column 815 stores a printing job name. The owner column 820 stores the owner (the owner of printed matter which is the final processing result, an end user) of the printing job. The number-of-pages column 825 stores the number of pages of a printing document in the printing job. The number-of-copies column 830 stores the number of copies of printing in the printing job. The sheet size column 835 stores the size of a sheet in the printing job. The sheet type column 840 stores the type of sheet. The printing document column 845 stores a printing document in the printing job. The printing document column may store the printing document itself, or may store a location where the printing document is stored (for example, a document ID, a document name, a Uniform Resource Locator (URL), or the like) . The color/black-and-white column 850 may store information indicating whether the printing job is color printing or black-and-white printing. In the color/black-and-white column 850, not only color and black-and-white but also a special color (a gold color, a silver color, a fluorescent color, and the like) may be designated. The designated date and time column 855 stores the date and time (may be year, month, day, hour, minute, second, a time unit smaller than second, or a combination thereof) when the printing job is scheduled to be started (or terminated). The post-processing column 860 stores post-processing (for example, stapler processing, punching processing, binding processing, and the like) in the printing job.

In a printing apparatus table 900, information on the image forming apparatus 150 is managed. For example, the printing apparatus table is used in a case where the image forming apparatus 150 managing a single printing job or a group printing job is selected.

FIG. 9 is a diagram illustrating an example of a data structure of the printing apparatus table 900. The printing apparatus table 900 includes a printing apparatus ID column 905, a printing apparatus name column 910, a printing speed column 915, a mountable toner type column 920, a mountable sheet column 925, a double-sided printing column 930, a maximum sheet feed capacity column 935, a number-of-discharging-destinations column 940, a post-processing function column 945, and a printing cost column 950. The printing apparatus ID column 905 stores information (printing apparatus ID) for uniquely identifying a printing apparatus in this exemplary embodiment. The printing apparatus name column 910 stores the name of the printing apparatus. The printing speed column 915 stores a printing speed of the printing apparatus. Meanwhile, the printing speed column 915 may be provided with a printing speed for each type of sheet (A4 size, A3 size, and the like). The mountable toner type column 920 stores the type of toner mountable in the printing apparatus. For example, the type of toner includes the type of color toner (a black toner, a cyan toner, a magenta toner, a yellow toner, a special color toner, and the like). The mountable sheet column 925 stores a sheet mountable in the printing apparatus. The double-sided printing column 930 stores indicating whether or not the printing apparatus is capable of performing double-sided printing. The maximum sheet feed capacity column 935 stores a maximum sheet feed capacity of the printing apparatus. The number-of-discharging-destinations column 940 stores the number of discharging destinations included in the printing apparatus. Further, the number-of-discharging-destinations column may store a capacity (the number of discharged sheets capable of being received by the discharged sheet reception unit) in the discharging destination. The post-processing function column 945 stores a post-processing function of the printing apparatus. The printing cost column 950 stores printing costs in the printing apparatus.

For example, it is determined whether or not printing may be performed using a sheet having a sheet size (the sheet size column 835 of the printing job table 800) of a single printing job or a group printing job in accordance with the mountable sheet column 925 of the printing apparatus table 900 to select the image forming apparatus 150. In addition, the image forming apparatus may be selected in accordance with whether or not color printing may be performed (specifically, matching processing of the color/black-and-white column 850 and the mountable toner type column 920), whether or not printing may be performed on printing sheets without supplying sheets in the middle of printing (specifically, the number of printing sheets is calculated using the number-of-pages column 825 and the number-of-copies column 830, and it is determined whether or not the calculated number of printing sheets is equal to or less than the value in the maximum sheet feed capacity column 935), or the like.

Meanwhile, in a case where the number of printing apparatuses capable of printing a single printing job or a group printing job is two or more, a printing apparatus having a short printing time (a high printing speed) and low printing costs may be selected.

Figure 10:
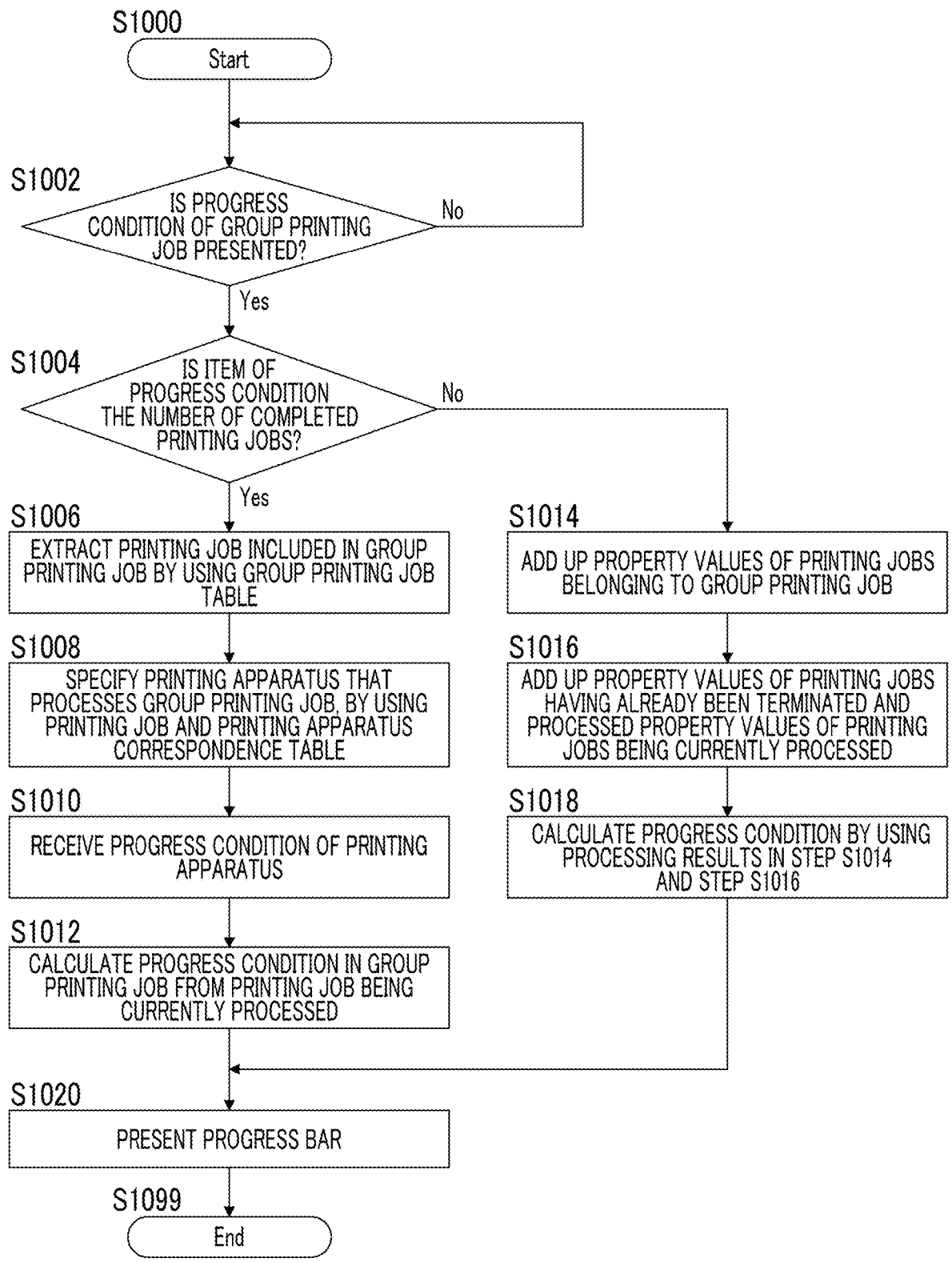
FIG. 10 is a flowchart illustrating a processing example according to this exemplary embodiment.

FIG. 10 is a flowchart illustrating a processing example according to this exemplary embodiment (mainly the progress condition presentation module 120).

In step S1002, it is determined whether or not the progress condition of the group printing job is presented. In a case where the progress condition of the group printing job is presented, the processing proceeds to step S1004. Otherwise, it is waited until the progress condition of the group printing job is presented.

In step S1004, it is determined whether or not an item of the progress condition is the number of completed printing jobs. The processing proceeds to step S1006 in a case where the item of the progress condition is the number of completed printing jobs, and proceeds to step S1014 otherwise. Specifically, a progress condition item may be extracted and determined using the group printing job and progress condition item correspondence table 600.

In step S1006, a printing job included in the group printing job is extracted using the group printing job table 700 (specifically, the printing job ID column 725).

In step S1008, a printing apparatus that processes the group printing job is specified using a printing job and printing apparatus correspondence table 1100. The printing job and printing apparatus correspondence table 1100 will be described later using the example of FIG. 11.

In step S1010, the progress condition of the printing apparatus is received. For example, a printing apparatus-based processing condition table 1200 and a group printing job processing condition table 1300 which are respectively illustrated in FIGS. 12 and 13 to be described later, and the like are received from the printing apparatus.

In step S1012, a progress condition in the group printing job is calculated from a printing job being currently processed. For example, it is specified to which printing job in the group printing job name column 715 of the group printing job table 700 a printing job in a printing job ID column 1230 of the printing apparatus-based processing condition table 1200 corresponds. Thereby, it is understood which printing job in the group printing job the printing job being currently processed corresponds. For example, in a case where a third printing job among five printing jobs is currently processed, two printing jobs have been completed, and thus a progress bar shows that 40% of printing has been completed.

In step S1014, property values of printing jobs belonging to the group printing job are added up. Values of items of progress conditions are added up. For example, in a case where the item of the progress condition is the number of sheets, the numbers of printed sheets in the respective printing jobs are added up.

In step S1016, property values of printing jobs having already been terminated and the processed property values of printing jobs being currently processed are added up. For example, in a case where the item of the progress condition is the number of sheets, the numbers of printed sheets in the printing jobs having already been completed are added up, and the numbers of printed sheets in the printing jobs being currently processed is added thereto.

In step S1018, a progress condition is calculated using the processing results in step S1014 and step S1016. For example, in a case where the item of the progress condition is the number of sheets, a ratio of the number of printed sheets which is calculated in step S1016 to the number of printed sheets which is calculated in step S1014 is calculated. Naturally, the item is the length of a printed sheet (meter or the like) in a case where the sheet is roll paper, the number of printed copies, and the like, in addition to the number of printed sheets.

In step S1020, the progress bar is presented. The progress bar is presented in accordance with the processing conditions calculated in step S1012 and step S1018.

Figure 11:
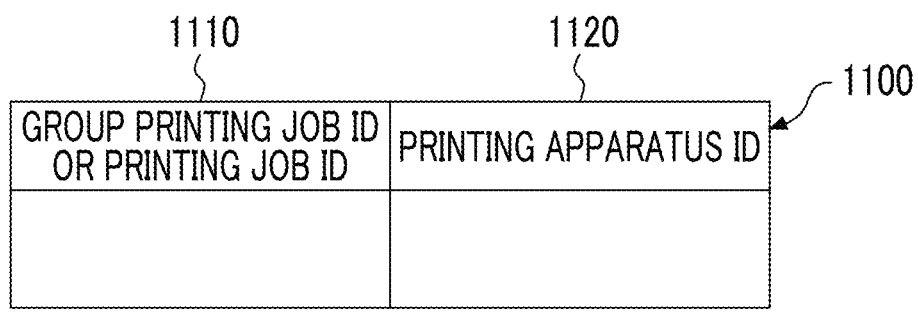
FIG. 11 is a diagram illustrating an example of a data structure of a printing job and printing apparatus correspondence table.

FIG. 11 is a diagram illustrating an example of a data structure of the printing job and printing apparatus correspondence table 1100.

The printing job and printing apparatus correspondence table 1100 includes a group printing job ID or printing job ID column 1110 and a printing apparatus ID column 1120. The group printing job ID or printing job ID column 1110 stores a group printing job ID or a printing job ID. The printing apparatus ID column 1120 stores a printing apparatus ID of a printing apparatus that performs printing processing in accordance with the group printing job ID or the printing job ID.

FIG. 12 is a diagram illustrating an example of a data structure of the printing apparatus-based processing condition table 1200.

The printing apparatus-based processing condition table 1200 includes a printing apparatus ID column 1210, a date and time column 1220, a printing job ID column 1230, a number-of-printed-pages column 1240, a number-of-surfaces column 1250, and a number-of-copies column 1260. The printing apparatus ID column 1210 stores a printing apparatus ID. The date and time column 1220 stores the date and time of reporting for processing conditions of the printing apparatus. The printing job ID column 1230 stores a printing job ID which is processed by the printing apparatus. The number-of-printed-pages column 1240 stores the number of pages printed at the date and time. The number-of-surfaces column 1250 stores the number of surfaces printed at the date and time. The number-of-copies column 1260 stores the number of copies printed at the date and time.

FIG. 13 is a diagram illustrating an example of a data structure of a group printing job processing condition table 1300.

The group printing job processing condition table 1300 includes a group printing job ID column 1310, a processing condition flag column 1320, a number-of-printing jobs column 1330, a start date and time column 1340, a completion date and time column 1350, and the like. The group printing job ID column 1310 stores a group printing job ID. The processing condition flag column 1320 stores a processing condition flag. For example, "1: waiting", "2: printing", "3: completed", "4: error stop". The number-of-printing jobs column 1330 stores the number of printing jobs constituting the group printing job. The start date and time column 1340 stores a date and time when the printing of the group printing job is started. The completion date and time column 1350 stores a date and time when the printing of the group printing job is completed.

FIG. 14 is a diagram illustrating a display example of a screen 1400 in a case where this exemplary embodiment is not used (a case where a display method of the related art is applied to a group printing job as it is).

A printing job display region 1410 is displayed on the screen 1400. The printing job display region 1410 includes a check column 1412, an ID column 1414, a printing job name column 1416, a status column 1418, a number-of-copies column 1420, a transmission destination column 1422, a progress column 1424, and a detail column 1426.

The printing job display region 1410 is obtained by adding the progress column 1424 to the printing job display region 410 described with reference to the example of FIG. 4. The check column 1412, the ID column 1414, the printing job name column 1416, the status column 1418, the number-of-copies column 1420, the transmission destination column 1422, and the detail column 1426 which are included in the printing job display region 1410 are respectively equal to the check column 412, the ID column 414, the printing job name column 416, the status column 418, the number-of-copies column 420, the transmission destination column 422, and the detail column 424 which are included in the printing job display region 410 illustrated in the example of FIG. 4. A progress condition in each printing job or group printing job is presented in the progress column 1424. In this example, a progress bar is presented by the number of printed sheets.

As also described in the example of FIG. 4, a single printing job and a group printing job is presented in the printing job display region 1410. Regarding group printing jobs (group printing jobs having a group printing job mark 1432 and a group printing job mark 1436 respectively attached thereto), a progress bar 1434 and a progress bar 1438 are presented in the same item (the number of printed sheets), regardless of different forming conditions of the group printing jobs. For example, the group printing job having the group printing job mark 1432 attached thereto is a printing job group collected for each printing paper (for example, A4 paper), but the group printing job having the group printing job mark 1436 attached thereto is a printing job group collected for each operator in charge. In this case, the number of printed faces is desired to be confirmed by the progress bar in the former case, but the number of printing jobs is desired to be confirmed by the progress bar in the latter case.

However, the progress bar is presented in the number of printed sheets in the same manner. That is, the progress bar is presented in the same item, regardless of different forming conditions of the group printing jobs and different items desired to be confirmed.

FIG. 15 is a diagram illustrating a display example of a screen 1500 according to this exemplary embodiment.

A printing job display region 1510 is displayed on the screen 1500. The printing job display region 1510 includes a check column 1512, an ID column 1514, a printing job name column 1516, a status column 1518, a number-of-copies column 1520, a transmission destination column 1522, a progress column 1524, and a detail column 1526.

The printing job display region 1510 is obtained by adding the progress column 1524 to the printing job display region 410 described with reference to the example of FIG. 4. The check column 1512, the ID column 1514, the printing job name column 1516, the status column 1518, the number-of-copies column 1520, the transmission destination column 1522, and the detail column 1526 which are included in the printing job display region 1510 are respectively equal to the check column 412, the ID column 414, the printing job name column 416, the status column 418, the number-of-copies column 420, the transmission destination column 422, and the detail column 424 which are included in the printing job display region 410 illustrated in the example of FIG. 4.

In this example, it is possible to confirm the number of printed surfaces by a progress bar 1534 and to confirm the number of printing jobs by a progress bar 1538. The "number of surfaces" which is an item name, the number of completed surfaces, and a total number of surfaces to be printed in the group printing job are presented within the progress bar 1534. The "number of jobs" which is an item name, the number of completed printing jobs, and the number of printing jobs constituting the group printing job are presented within the progress bar 1538. That is, a progress bar is presented in accordance with forming conditions for a group printing job.

Regarding a group printing job, plural progress bars for different items may be presented. For example, two progress bars of a progress bar of the same item (for example, the number of printed sheets) as that of another printing job and a progress bar of an item particular to the group printing job may be presented.

Regarding a group printing job, a progress bar may be presented in an item which is set for the printing job, for each printing job constituting the group printing job. Therefore, a progress bar may be presented in a different item every time a printing job being currently processed in the group printing job changes.

In the progress bar, a progress condition may be displayed together with a closing condition. For example, a closing date and time itself may be displayed so as to be superimposed on the progress bar, and a time until the closing date and time may be displayed so as to be superimposed on the progress bar.

A hardware configuration example of the information processing apparatus 100 according to this exemplary embodiment will be described with reference to FIG. 16. A configuration illustrated in FIG. 16 is configured by, for example, a personal computer (PC) or the like, and the hardware configuration example including a data reading unit 1617 such as a scanner and a data output unit 1618 such as a printer is illustrated.

A Central Processing Unit (CPU) 1601 is a control unit that executes processing based on a computer program in which the execution sequence of various modules described in the above-described exemplary embodiment, that is, the image forming apparatus communication module 110, the image forming apparatus condition detection module 115, the progress condition presentation module 120, and the progress condition item setting module 130 is described.

A Read Only Memory (ROM) 1602 stores programs, computational parameters, and the like which are used by the CPU 1601. A Random Access Memory (RAM) 1603 stores programs used in the execution of the CPU 1601, parameters that appropriately change in the execution, and the like. The Rom and the RAM are connected to each other by a host bus 1604 constituted by a CPU bus or the like.

The host bus 1604 is connected to an external bus 1606 such as a Peripheral Component Interconnect/Interface (PCI) bus through a bridge 1605.

A keyboard 1608 and a pointing device 1609 such as a mouse are devices operated by an operator. A display 1610 is a liquid crystal device, a Cathode Ray Tube (CRT), or the like, and displays various pieces of information as texts or image information. In addition, a touch screen or the like which has both functions as the pointing device 1609 and the display 1610 may be used. In this case, regarding the realization of the function of the keyboard, the function of the keyboard may be realized by drawing a keyboard (also referred to as a so-called software keyboard, a screen keyboard, or the like) on a screen (touch screen) using software without physical connection like the keyboard 1608.

A Hard Disk Drive (HDD) 1611 has a hard disk (may be a flash memory or the like) embedded therein, drives the hard disk, and records or reproduces programs executed by the CPU 1601 and information. The hard disk executes functions as the printing job storage module 105, the group printing job and progress condition item storage module 125, and the like. Further, the hard disk stores various other pieces of data (the group printing job and progress condition item correspondence table 600, the group printing job table 700, the printing job table 800, the printing apparatus table 900, the printing job and printing apparatus correspondence table 1100, the printing apparatus-based processing condition table 1200, and the group printing job processing condition table 1300), various computer programs, and the like.

The drive 1612 reads out data or programs recorded in a removable storage medium 1613, such as a magnetic disk, an optical disk, a magneto-optical disk, or a semiconductor memory, which is mounted therein, and supplies the data or the programs to the RAM 1603 connected thereto to the RAM 1603 connected thereto through an interface 1607, the external bus 1606, the bridge 1605, and the host bus 1604. Meanwhile, the removable storage medium 1613 may also be used as data storage region.

The connection port 1614 is a port for connection to an external connection device 1615, and includes a connection unit such as a USB or IEEE1394. The connection port 1614 is connected to the CPU 1601 and the like through the interface 1607, the external bus 1606, the bridge 1605, the host bus 1604, and the like. A communication unit 1616 is connected to a communication line, and executes data communication processing with the outside. The data reading unit 1617 is, for example, a scanner, and executes a process of reading a document. A data output unit 1618 is, for example, a printer, and executes a process of outputting document data.

Meanwhile, a hardware configuration of the information processing apparatus 100 illustrated in FIG. 16 shows one configuration example. This exemplary embodiment is not limited to the configuration illustrated in FIG. 16, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 16 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multi-function machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display, and
a processor coupled to the display and configured to:
receive a progress condition from the plurality of print apparatuses, wherein the progress condition comprises a first grouped printing job which comprises a first print job and a second print job, and a third print job which is not grouped, wherein the first print job and the second print job having been grouped into a same group based on one of a plurality of print conditions, and the first print job has a first job identification (ID) and the second print job has a second job ID which is different from the first job ID, and the third print job has a third job ID, and first grouped printing job has a fourth job ID,
display on a screen of the display, under a first column, the first job ID, the second job ID, the third job ID, and the fourth job ID when members of the first grouped printing job is being shown,
display a progress screen which indicates the progress condition of the first grouped printing job and a print status of the third print job which is displayed right next to the first grouped printing job, wherein the processor is further configured to display a total number of print jobs included in the first grouped printing job as a part of a name of the first grouped printing job, and display a number of copies of each of the first print job, the second print job and the third print job, wherein the total number of print jobs is different from the number of copies,
display on the screen of the display device, under a second column, a printing job name of the first print job, a printing job name of the second print job, a printing job name of the third print job, and a printing job name of the first grouped printing job when members of the first grouped printing job is being shown, and
display on the screen of the display device, and under the second column, the printing job name of the third print job and the printing job name of the first grouped printing job without the printing job name of the first print job and without the printing job name of the second print job when members of the first grouped print job is not being shown.

2. The information processing apparatus according to claim 1, wherein the processor is further configured to control the display to display a first displayed item for presenting the print status of the third print job that is not grouped and a second displayed item which is different from the first displayed item for presenting the progress condition of the first grouped printing job.

3. The information processing apparatus according to claim 2, wherein the second displayed item for presenting the progress condition of the first grouped printing job includes at least the number of terminated printing jobs constituting the first grouped printing job.

4. The information processing apparatus according to claim 1, wherein the processor is configured to display a ratio for presenting the progress condition of the first grouped printing job and a transmission status for the third group job.

5. The information processing apparatus according to claim 4, wherein the processor is configured to display the progress condition of the first grouped printing job by using a progress bar.

6. The infoi nation processing apparatus according to claim 1, wherein the processor is configured to display a print status of the first grouped printing job and does not display a number of copies of the first grouped printing job.

7. The information processing apparatus according to claim 1, wherein the processor is configured to display the first print job and the second print job as a tree structure inside the grouped printing job when the processor receives a user's instruction to open the first grouped printing job.

8. The information processing apparatus of claim 1, wherein the total number of print jobs included in the first grouped printing job as the part of the name of the first grouped printing job is displayed under the second column on a same row as the printing job name of the first grouped printing job.

9. The information processing apparatus of claim 8, wherein the total number of print jobs is a total quantity of the members of the first grouped printing job.

10. The information processing apparatus of claim 1, wherein the processor is further configured to display on the screen of the display device, under a third column, the number of copies of each of the first print job, the second print job and the third print job.

11. The information processing apparatus of claim 1, wherein the processor is further configured to display on the screen of the display device, under the first column, a fifth job ID corresponding to a second grouped printing job, wherein members of the second grouped printing job is not being shown.

12. The information processing apparatus of claim 11, wherein the processor is further configured to display on the screen of the display device, a first group printing job mark and a second group printing job mark which has a same shape as the first group printing job mark, wherein the first group printing job mark points to a first direction when members of the first grouped printing job is being shown, and the first group printing job mark points to a different direction from the first direction when members of the second grouped printing job is not being shown.

13. The information processing apparatus of claim 11, wherein each of the fourth job ID and the fifth job ID is a larger number than any of the first job ID, the second job ID, and the third job ID.

14. A non-transitory computer readable medium storing an information processing program causing a computer comprising a display and a processor to:
- receive a progress condition from the plurality of print apparatuses, wherein the progress condition comprises a first grouped printing job which comprises a first print job and a second print job, and a third print job which is not grouped, wherein the first print job and the second print job having been grouped based on one of a plurality of print conditions, and the first print job has a first job identification (ID) and the second print job has a second job ID which is different from the first job ID, and the third print job has a third job ID, and first grouped printing job has a fourth job ID;
- display on a screen of the display, under a first column, the first job ID, the second job ID, the third job ID, and the fourth job ID when members of the first grouped printing job is being shown,
- display a progress screen which indicates the progress condition of the first grouped printing job and a print status of the third print job which is displayed right next to the first grouped print job, wherein the processor is further configured to display a total number of print jobs included in the first grouped printing job as a part of a name of the first grouped printing job, and display a number of copies of each of the first print job, the second print job and the third print job, wherein the total number of print jobs is different from the number of copies,
- display on the screen of the display device, under a second column, a printing job name of the first print job, a printing job name of the second print job, a printing job name of the third print job, and a printing job name of the first grouped printing job when members of the first grouped printing job is being shown, and
- display on the screen of the display device, and under the second column, the printing job name of the third print job and the printing job name of the first grouped printing job without the printing job name of the first print job and without the printing job name of the second print job when members of the first grouped print job is not being shown.

* * * * *